United States Patent [19]

Kriegl et al.

[11] 4,245,938
[45] Jan. 20, 1981

[54] DEVICE FOR POSITIONING A TOOL CARRIAGE

[75] Inventors: Max Kriegl; Georg Riedmayr, both of Munich, Fed. Rep. of Germany

[73] Assignee: Carl Hurth Maschinen- und Zahnradfabrik, Munich, Fed. Rep. of Germany

[21] Appl. No.: 5,664

[22] Filed: Jan. 22, 1979

Related U.S. Application Data

[63] Continuation of Ser. No. 823,426, Aug. 10, 1977, abandoned.

[30] Foreign Application Priority Data

Aug. 20, 1976 [DE] Fed. Rep. of Germany ....... 2637462
Jan. 18, 1977 [DE] Fed. Rep. of Germany ....... 2701733
Jan. 27, 1977 [DE] Fed. Rep. of Germany ....... 2703214

[51] Int. Cl.³ .................. B23F 5/20; B23B 21/00; B23Q 5/52
[52] U.S. Cl. ........................... 409/15; 82/34 A; 82/34 B; 408/14; 409/218; 409/220
[58] Field of Search ............. 409/218, 220, 6, 15, 409/153; 408/14; 318/468, 467, 626; 82/34 A, 34 B

[56] References Cited

U.S. PATENT DOCUMENTS

| 1,757,929 | 5/1930 | Shaw et al. ..................... 409/218 X |
| 2,012,493 | 8/1935 | Barnes ............................... 408/14 X |
| 2,988,964 | 6/1961 | Van Acker ......................... 409/15 |
| 3,146,676 | 9/1964 | Carpenter ......................... 409/153 |
| 3,350,617 | 10/1967 | Firth .............................. 409/220 X |
| 3,633,088 | 1/1972 | Kupersmith ....................... 318/626 |
| 3,812,761 | 5/1974 | Southworth ....................... 409/15 |
| 3,865,010 | 2/1975 | Hodgson .......................... 409/15 |

FOREIGN PATENT DOCUMENTS

| 2135083 | 2/1973 | Fed. Rep. of Germany ........... 408/14 |
| 1282936 | 12/1961 | France ............................ 82/34 B |
| 279731 | 11/1927 | United Kingdom ................. 82/34 B |
| 825439 | 12/1959 | United Kingdom ................. 409/218 |
| 967170 | 8/1964 | United Kingdom ................. 82/34 B |

Primary Examiner—William R. Briggs
Attorney, Agent, or Firm—Blanchard, Flynn, Thiel, Boutell & Tanis

[57] ABSTRACT

A device for controlling and positioning a carriage in a tool machine, in particular the feed carriage on a gear hobbing machine. The device utilizes cams oriented one after the other and which operate a plurality of switches to control the advance of the carriage. The end position of the carriage which is controlled by a control switch is determined by two cam carriages. The first cam carriage is positionable with a rough or coarse adjustment relative to the machine frame and the second cam carriage is finely adjustable relative to the first cam carriage. The cam carriages carry the aforementioned cams to effect a control of the movement of the feed carriage path adjacent the workpiece.

12 Claims, 7 Drawing Figures

DEVICE FOR POSITIONING A TOOL CARRIAGE

This is a continuation of application Ser. No. 823,426, filed Aug. 10, 1977, now abandoned.

FIELD OF THE INVENTION

The invention relates to a control device for controlling and positioning a carriage in tool machine, in particular for controlling the feed motion on gear hobbing machines utilizing cams oriented one after the other and operate switches to control the advance of the carriage and a control switch.

BACKGROUND OF THE INVENTION

Control devices of this type are already known. In the known control devices, the cams which control the feed movement and the limit stop are each newly located during adjustment of the machine. This setting of the cams is time consuming and increases the expense of the entire working time on the machine, in particular if a small number of pieces are to be worked, which is particularly the case in machines working on large workpieces, in particular large gears.

Therefore, the basic purpose of the invention is to provide a device wherein the setting up of the machine is simplified and the time needed for this is shortened. The basic purpose of the invention is attained with a control device wherein the final position of the carriage can be driven from a control switch and which faces the workpiece, is determined by two cam carriages, of which the first cam carriage can be positioned with a rough or coarse adjustment relative to the machine frame and the second cam carriage which has a stop surface thereon can be finely adjusted relative to the first cam carriage, and wherein the cam carriages carry the cams which control the feed at the end of the carriage path which faces the workpiece. This device has not only advantages with respect to adjusting the cams and the end positions, but hobbing machines can be simply and quickly set for both a method having a longitudinal feed and also for plunge cutting.

Particularly advantageous is a development wherein the end position is controlled by an electric motion pickup device, for example by means of an inductive motion pickup device which controls the feed speed to zero and which is driven into engagement with the stop surface, because through this the end position can be precisely controlled for protection of the machine. Inductive motion pickup devices are common in commerce and are sold for example by the Firm Novotechnik KG, Offerdinger & Co. 7304 Ruit near Stuttgart, Federal Republic of Germany, under the name Linotast.

The accomplishment of a rough of coarse adjustment is attained in a simple manner by providing a screw spindle and a spindle nut while a simple and exact adjustment of the limit stop surface can take place in a favorable manner by providing a micrometer screw.

The path of the carriage, in particular the cutting carriage can be adjusted to an optimum position by providing a further cam on the machine column or carrier for the cam carriage or a corresponding part, which further cam can be adjusted and secured on the path of the carriage, for example cutting carriage. The cam is the only cam which must be set for the feed movement.

In order to be able to cut on hobbing machines cluster gears having gears with differing diameters or in order to be able to carry out a multi-cut method or in order to be able to carry out corresponding operations on different tool machines, the first cam carriage can be switched over relative to the spindle nut to at least two positions and an easy handling is assured by making the path of adjustment of the first cam carriage adjustable relative to the spindle nut with a stop device and by providing a micrometer screw for adjusting the stop devices.

The invention has the further purpose of providing an economical copying device for a small copying stroke over a large field of adjustment and which is formed of the entire downfeed stroke and the entire longitudinal path.

This purpose is attained by providing a second electric motion pickup device, for example an inductive motion pickup device, which engages a template or the like, which has the same or proportional characteristic line as the first electric motion pickup device and which trails the second motion pickup device which acts as its transmitter. Such a device unifies the advantage of being able to set the machine simply and shortening the time needed therefor, in particular also the advantage that the end position of the carriage is controlled carefully and very exactly with the advantage that in spite of the large field of adjustment a simple copying device which is suitable for a relatively small copying path can be provided.

Further objects and purposes as well as advantages and characteristics of the invention will become clear from the following description.

BRIEF DESCRIPTION OF THE DRAWINGS

The invention is discussed in connection with the following exemplary embodiment which is described with reference being made to FIGS. 1 to 7.

In the drawings.

DETAILED DESCRIPTION

Figure 1:
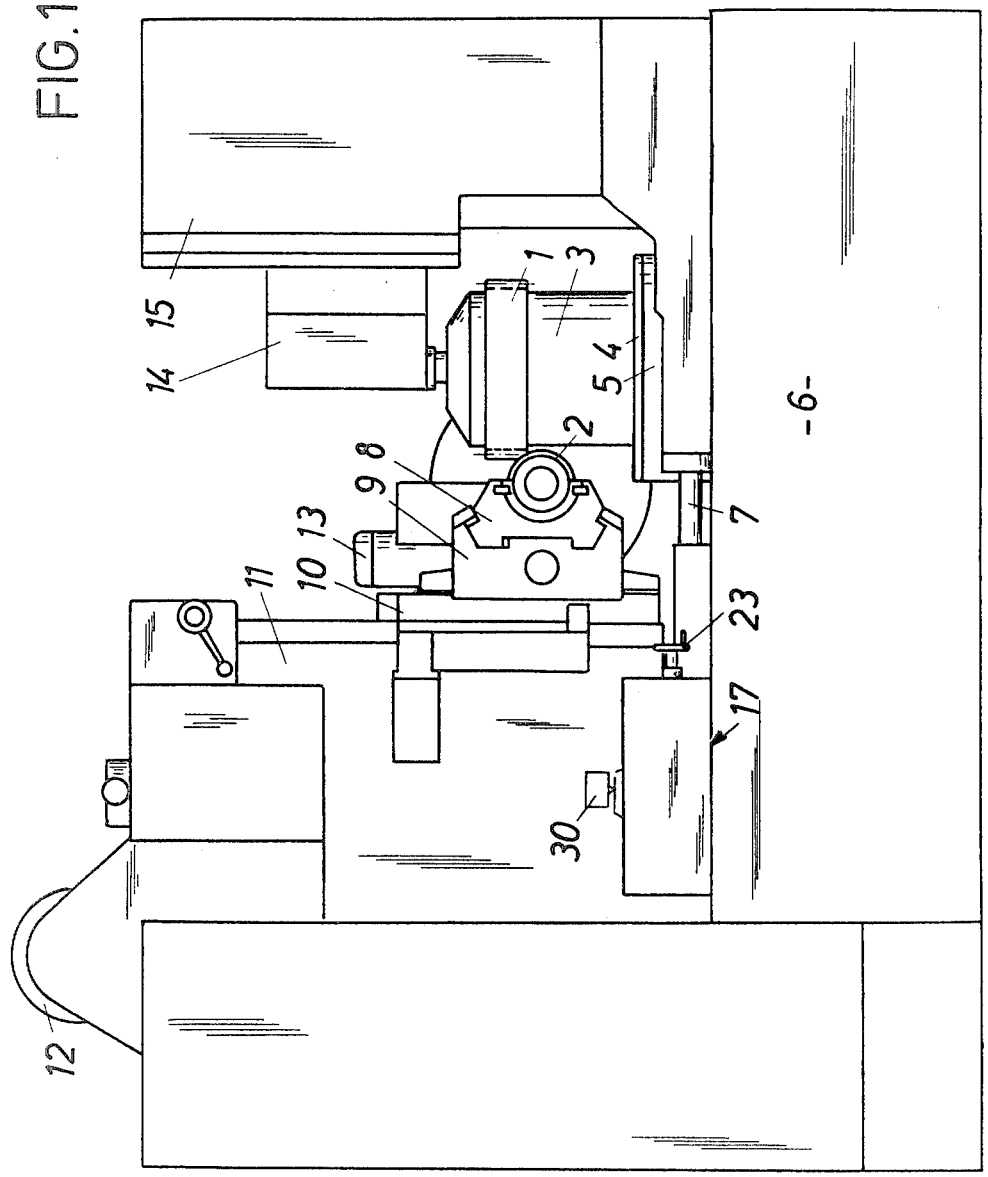
FIG. 1 is a hobbing machine to which the invention is applied.

FIG. 1 illustrates a gear hobbing machine to which the invention is applied. The workpiece 1, a spur gear, is worked with a hob 2 and is clamped with the aid of a chuck 3 on the faceplate 4 of a workpiece spindle 5. The workpiece spindle is rotatably supported in the machine frame 6. The workpiece spindle is driven from a drive motor 12 through a not shown gearing and through a transmitting shaft 7 and through a not shown worm gearing.

The hob 2 is rotatably supported in a shift carriage 8. The associated carriage guide 9 is pivotally supported on a longitudinal carriage 10 namely so that the lead angle and tooth pitch on the hob can be adjusted to the tooth pitch and to the lead angle of the workpiece teeth. With the aid of the longitudinal carriage 10, it is possible to move the hob 2 parallel to the axis of the workpiece spindle (in machines with differential gearings) or parallel to the workpiece teeth (in machines which operate according to the so-called Grant-method). The guide for the longitudinal carriage 10 is supported on a feed carriage 11 which can be moved at a right angle to the axis of the workpiece spindle 5 on not illustrated rails on the machine frame 6. The diameter and the tooth depth of the workpiece 3 can be selected and adjusted with the feed carriage 11. Longitudinal feed, rotation of the hob and rotation of the workpiece are each driven from the drive motor 12 through a gearing which is known in principle. A piston which is not shown is guided in a cylinder for driving the downfeed carriage 11. For shifting the hob a further electric motor, a so-called shift motor 13 is provided which acts onto the shift carriage 8 through a not shown gearing and an also not shown screw spindle.

Figure 2:
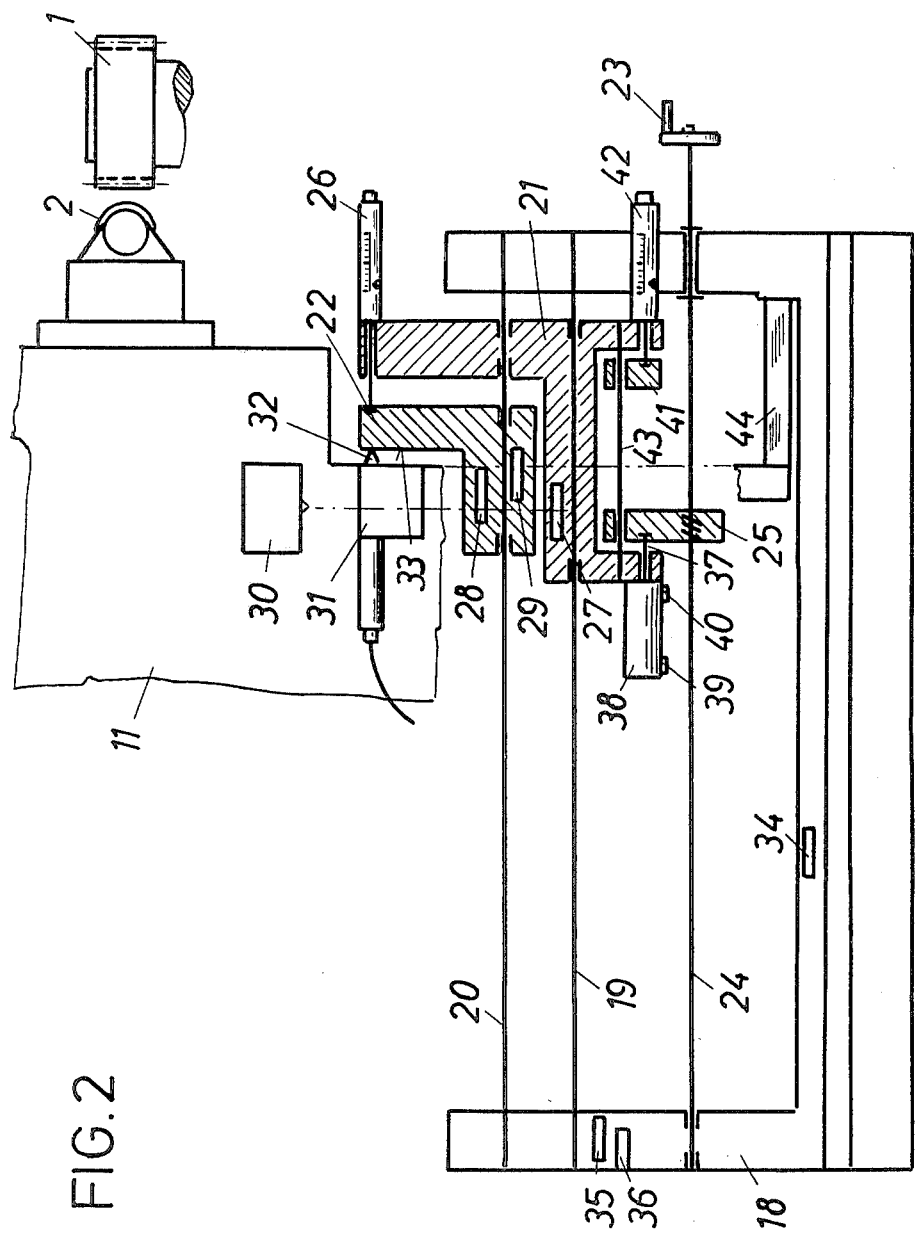
FIG. 2 is the plan of a control device according to the invention.

The workpiece 1 or its chuck or a mandrel can be supported by means of a tailstock 14. The tailstock is supported on an overarm block 15 which is secured to the machine frame and is drivable along guide rails on the block 15 or forms a single unit therewith. For clamping the workpiece on the faceplate or workpiece spindle, a drivable clamping device can be provided. For controlling the movement and positioning of the carriage 11, a control device 17 is provided which is schematically illustrated in FIG. 2. A first cam carriage 21 and a second cam carriage 22 are each longitudinally movably guided in a carrier 18 which is secured on the machine frame 6. The first cam carriage 21 can be adjusted by a crank 23 secured to a threaded spindle 24, which threaded spindle 24 is thready engaged with a spindle nut 25. The connection of the spindle nut 25 with the first cam carriage 21 will be described hereinbelow. The relative position between the two cam carriages 21 and 22 can be adjusted with a micrometer screw 26. A shift cam 27 is fixedly arranged on the first cam carriage. A trip cam 28 and a safety cam 29 are fixedly arranged on the second cam carriage, the exact position of which is described hereinbelow. These cams and the below-described cams are scanned by a multiple contact switch 30 (illustrated offset in FIG. 2), which is fixedly mounted on the carriage 11. In addition, an inductive motion pickup device 31 having a movable abutment pin 32 thereon is secured to the carriage 11, which motion pickup determines the end position of the carriage relative to the second cam carriage when the abutment pin 32 engages a stop surface 33 on the second cam carriage which is adjusted to the end position. The feed motion of the carriage 11 is then discontinued and a quick return is initiated.

The inductive motion pickup device 31 converts small rectilinear movements into analogue electric signals. For this a differential transformer having a movable core can be used. The core is connected to the abutment pin 32 and becomes active upon contact with the stop surface 33. Inductive motion pickup devices are known and can be obtained in commerce. The inductive motion pickup device acts through not shown valves onto the not shown piston driving the carriage 11 cylinder also not shown. Such an electro-hydraulic system can be obtained in commerce under the identification "electro-hydraulic linear amplifier". (Firm Hartmann+Laemmle oHG, Rutesheim, Federal Republic of Germany) (Magazine Oelhydraulic and Pneumatic, 18th year, No. 5, May 1974, Pages 1 to 4).

The shift cam 27 is selectively positioned so that the carriage 11 moves a fixed distance before contact of the abutment pin 32 with the stop surface 33. Thus it can for example be possible that the switch part of the multiple contact switch 30 which engages the shift cam 27 is activated 4 to 5 mm. of the feed path before the end position to initiate a switching over of the rapid forward run of the carriage 11 to the running-in speed for positioning purposes, for example, a speed of 500 mm/min. or the like.

The safety cam 29 is positioned a small distance following the cam 28 and the activation of the inductive motion pickup device. It affects a switching off of the feed in case the inductive motion pickup device should fail. The combination of the trip cam 28 with the inductive motion pickup device 31 is used when the carriage 11 moves to a cutting depth outside of the workpiece and cuts the tooth gaps during the longitudinal feed with the longitudinal carriage 10. The cutting depth is adjusted by first aligning the first cam carriage 21 so that the shift cam 27 is positioned to correspond to the location of the tool to the outside diameter of the workpiece without being actively machined during a machining operation (scratch point). From there the second cam carriage 22 is adjusted with the aid of the micrometer screw 26 relative to the cam carriage 21 so that the stop surface 33 is positioned to locate or determine, with the aid of the abutment pin 32, the tooth depth. Thus, the tooth depth or the tooth gap base is controlled by the first cam carriage 21 which acts as a means for effecting a rough adjustment and by the second cam carriage 22 with the micrometer screw 26 which acts as a means for effecting a fine adjustment.

If a plunge method is to be used on the machine, then the shift cam 27 on the first cam carriage 21 is again adjusted to a position to correspond to the location of the tool to the outside diameter of the workpiece or slightly before it. The depth of the tooth is again adjusted by positioning the second carriage 22 and the stop surface 33 with reference to the micrometer screw 26. During a machining operation, the shift cam 27 activates a switch part of the multiple contact switch to cause the rapid forward run to be switched over to a selected plunge feed, for example at a rate of between 0.5 to 100 mm/min. or the like. The trip cam 28 is ineffective. The safety cam 29 remains ready for activating a further switch part of the multiple contact switch.

So that the carriage 11 will not need to be driven back or retracted the entire distance after each cutting operation, a return cam 34 is mounted on the carrier 18 and acts onto another and separate switch part of the multiple contact switch 30. The position of the cam 34 can be selectively placed over the entire length of the path of movement of the carriage 11. It is the only cam which must be shifted during an aligning of the machine, which, however, need not be very exact, because it only switches off or deactivates the quick return motion of the carriage 11.

For the final switching off of the return motion of the carriage 11, a switch-off cam 35 is fixedly installed at the end of the return path, which switch-off cam switches off the quick return motion of the carriage at the end of the downfeed path remote from the workpiece. As a safety precaution and to eliminate the possibility of an overrunning of this cam, a safety switch-off cam 36 is provided a small distance therebehind. These cams too act onto other switch parts of the multiple contact switch 30.

Aside from the return cam 34, for which no exact placement is necessary, otherwise no cams are provided which need to be shifted. The cams at the workpiece end of the feed path are adjusted together with the stop surface 33 to determine the cutting depth. The cams for effecting the final switching off at the other end of the feed path are fixedly installed.

In order to be able to use the device for the automatic milling of cluster gears having spur gears of differing diameters, a development of the invention shows the spindle nut 25 not to be fixedly connected to the first cam carriage 21 but connected thereto through a piston rod 37 and a not shown piston which is snugly guided in a hydraulic cylinder 38. Piston and cylinder form in a conventional manner two chambers which can be selectively loaded through connections 39, 40 with pressure medium. It is thus possible to change the position of the first cam carriage 21 relative to the spindle nut 25. They can assume two positions with respect to one another. One position is determined by the spindle nut 25 and the first cam carriage 21 fixedly engaging one another (on the side thereof which faces the cylinder 38). The other position of the nut 25 relative to the carriage 21 is determined by a stop block 41 or the like the position of which can be adjusted on a guide rod 43 by means of a micrometer screw 42, which guide rod is supported in the first cam carriage 21. The adjusted distance of the spindle nut 25 from the said stop 41 corresponds to the radial difference between the outside diameters of the two gears which must be cut. First the first cam carriage 21 is moved with the piston in the cylinder 38 into the one position relative to the spindle nut 25 and in this manner the one gear is cut and thereafter a switch-over into the other position takes place by the operation of the cylinder 38 and the other gear is worked. Of course, this device can also be further developed in such a manner, for example by utilizing multiple stops, so that more than two positions of the first cam carriage relative to the spindle nut 25 are possible. This device can also be used for controlling a so-called multi-cut method by carrying out in the one position the first longitudinal feed and in the other position or positions the second longitudinal feed or further longitudinal feeds or plunge feeds.

According to a further development of the invention, it is also possible to provide an end scale between the machine frame 6 or the carrier 18 for the cam carriages mounted on the frame 6, and the first cam carriage 21 to make the adjustment procedures for determining an exact cutting depth during a cutting of worm gears easier.

Figure 5:
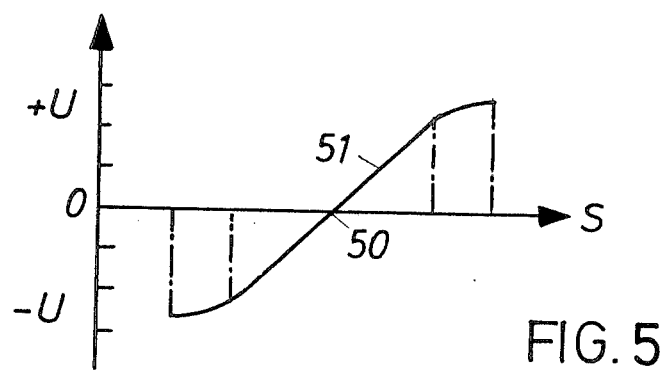
FIG. 5 illustrates the characteristic of an inductive motion pickup device.

FIG. 5 illustrates an example of the characteristic of an electric motion pickup device. The voltage U is presented on the ordinate, namely positive values from the O-line upwardly and negative values from the O-line downwardly. The abscissa illustrates the path S of the abutment pin 32 which acts for example through a movable core onto a differential transformer which in turn sends out control impulses for the drive of the carriage 11. The electric O-point lies on the point of intersection 50 of the voltage course 51 with the abscissa. If the abutment pin 32 shifts in the diagram of FIG. 5 to the right from the zero point 50, then a positive control voltage is obtained and the carriage 11 is driven toward one end. If the abutment pin shifts to the left from the O-point 50, then the carriage 11 is driven toward the other end.

According to the invention, this zero point can be adjusted relative to the carriage 11. This can be done for example by adjusting the tip of the abutment pin 32 relative to the core. An electric adjustment for example with the aid of a potentiometer is advantageous and the adjustment can be caused then by a signal which is given by the control program of the machine.

Figure 4:
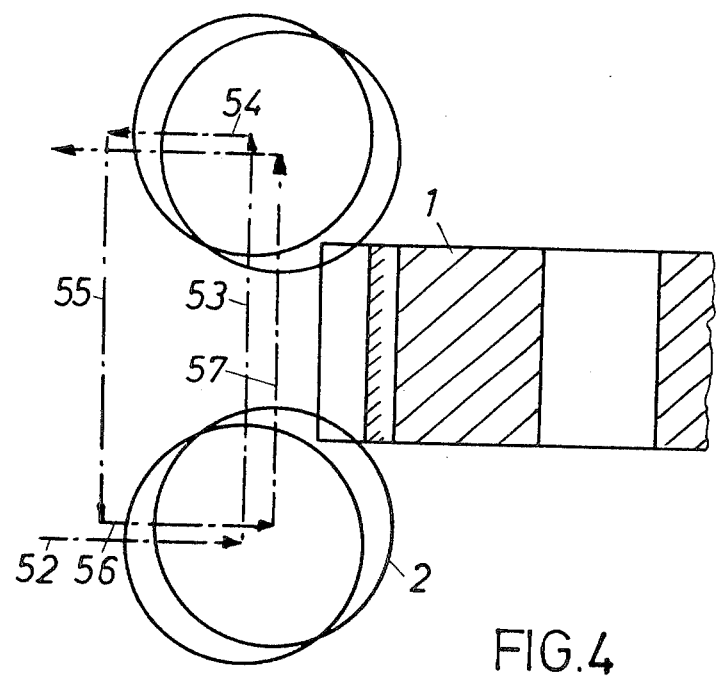
FIG. 4 schematically illustrates the feed path of a hob in a double-shearing method (the relative sizes are not according to scale)

FIG. 4 illustrates as an example the path of the hob 2 in a two-cut method for the cutting of a spur gear. The hob is first supplied with a feed motion 52 of the carriage 11 to a depth which corresponds to the location of the first cam carriage 21. The control of the feed was described hereinabove with reference to the two cam carriages 21, 22. After the desired depth is reached, the hob 2 carries out a longitudinal feed motion 53 with the longitudinal carriage 10 until the workpiece teeth are cut the first time. If the hob 2 is on the other side of the workpiece, then it is retracted away from the workpiece through a retraction motion 54 and is moved to the other side through a return movement 55 of the carriage 10. After this, it is assumed that the O-point of the electric motion pickup device has been adjusted for the second cut. The hob 2 then carries out a second feed motion 56 for the second cut which is performed during a second longitudinal feed 57 by the carriage 10. After the teeth have been cut the second time, the hob is guided back on a return path 58.

Cluster gears consisting of, for example, two spurs having differing diameters, are cut in a two-cut method corresponding to the above description with the difference that the cutting paths are switched over to the said different diameters with the aid of the movable spindle nut 25.

The zero point of the electric motion pickup device can of course also be adjusted many times for a multi-cut method (differing from the two-cut method).

Figure 3:
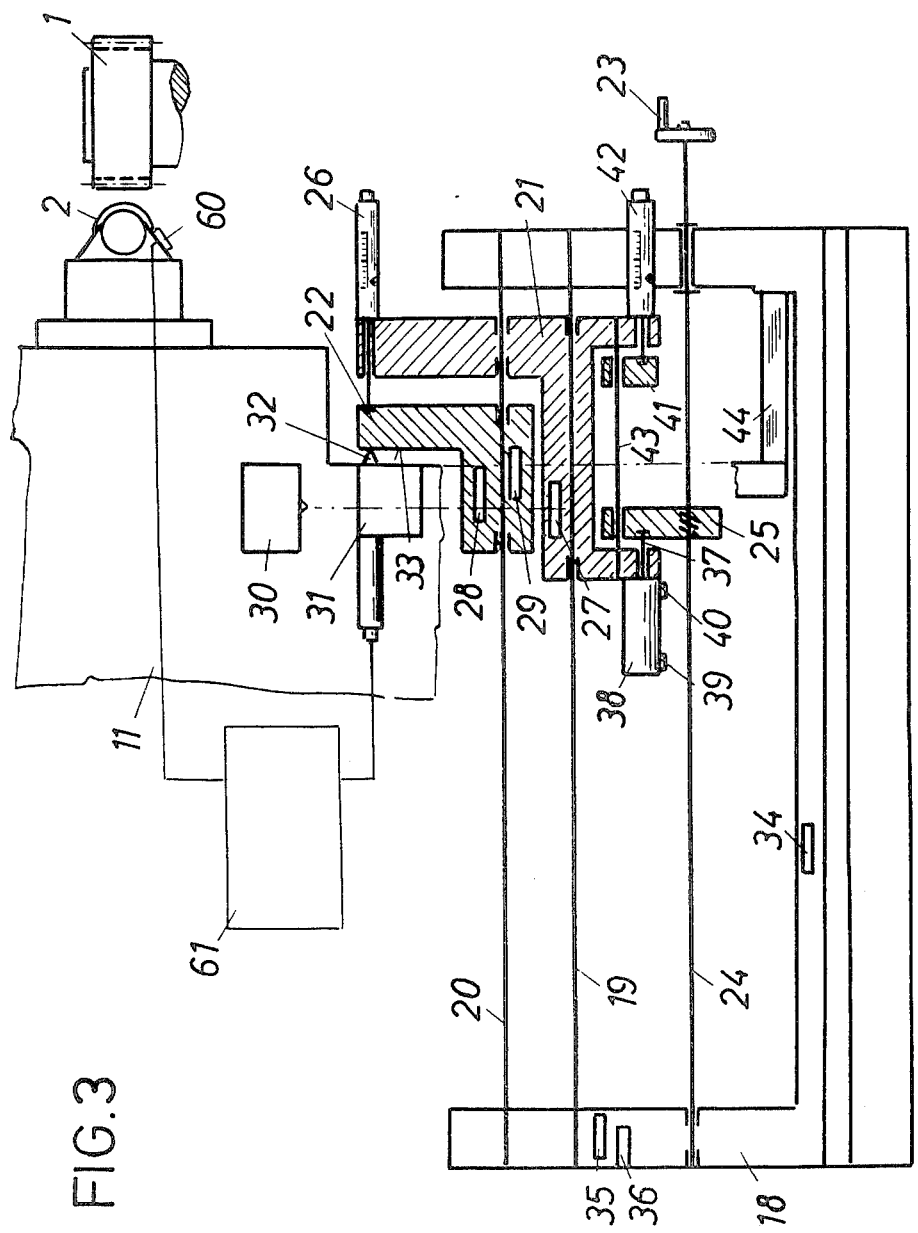
FIG. 3 is the plan of a further development of the invention.

As a temperature-sensitive point of the machine, for example near the hob 2 at the spindle bearing or in the stream of the cutting oil or in the lubricating oil or at a different suitable point, it is possible as shown in FIG. 3 to provide a temperature-dependent transmitter, for example a temperature-dependent resistor called a thermistor 60, which is connected to the electric motion pickup device within the electric switching arrangement 61 so that the zero point 50 of the electric motion pickup is at all times adjusted so that the heat expansions of the machine and of the workpiece chuck and thus dimension changes of the workpiece are compensated for at all times. One can proceed thereby in such a manner that the dimension changes which depend from the temperature are determined once and for all and this calibrated dependency is programmed onto the electric motion pickup device.

Figure 6:
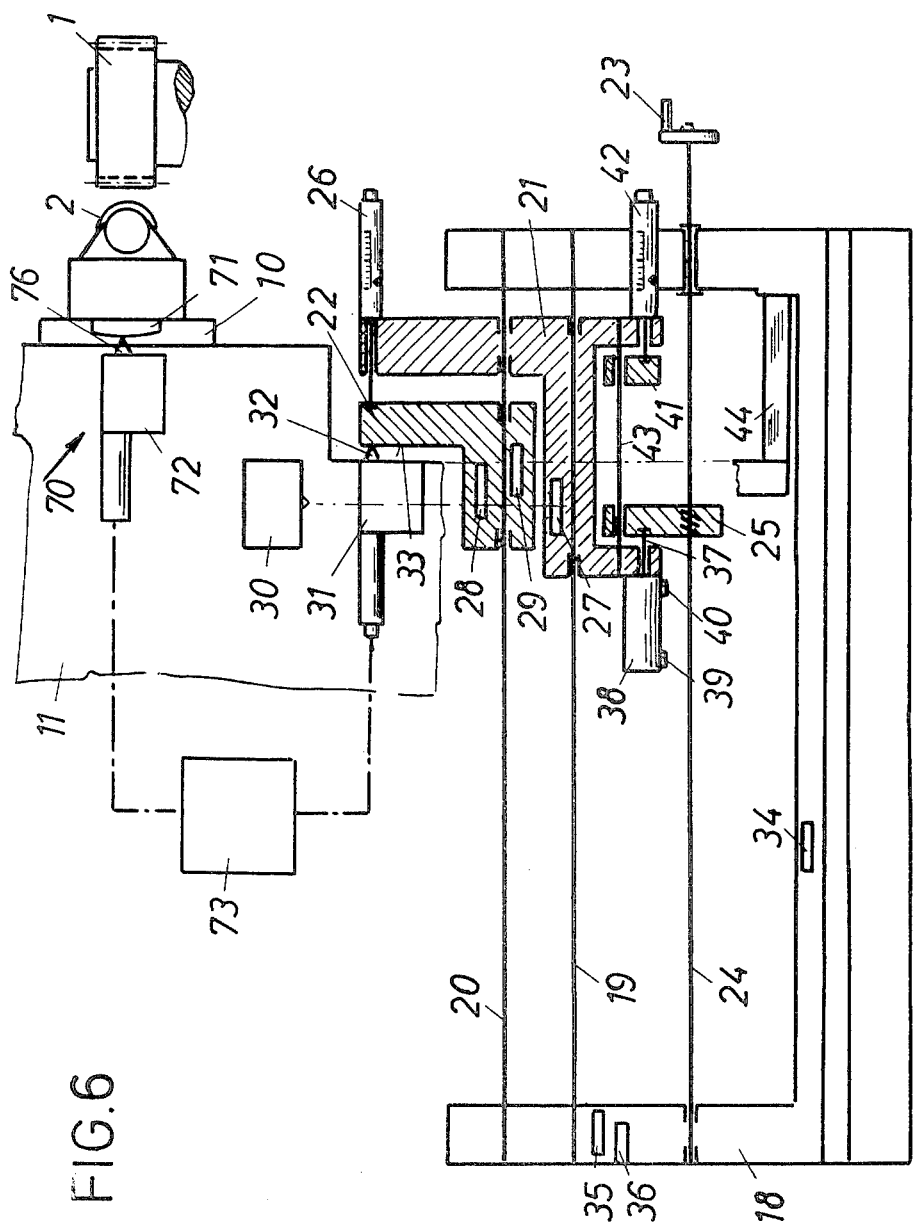
FIG. 6 illustrates the plan of a further development of the invention.

The described machine has a relatively large field of adjustment which describes a rectangle, the sides of which are formed by the movement of the entire feed carriage 11 and the entire longitudinal feed carried out by the movement of the longitudinal carriage 10. A copying device 70 (FIG. 6) having a relatively small copying path is rendered active at each point of the field of adjustment. For this purpose, an exchangeable template 71 is provided on the longitudinal carriage 10 and can be scanned by a second inductive motion pickup device 72 which is mounted on the feed carriage 11. This second motion pickup device 72 transmits like the first motion pickup device 31 signals to a control device 73.

Figure 7:
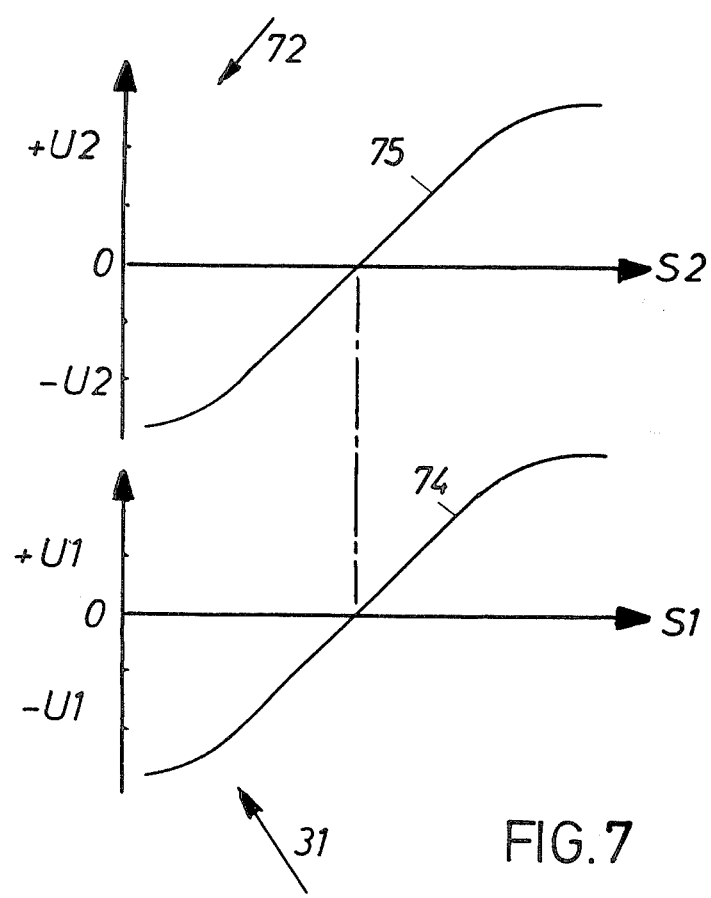
FIG. 7 schematically illustrates the characteristic voltage curves of the electric motion pickup devices which are used for the invention.

The first and second inductive motion pickup device have equal or proportional characteristic curves. FIG. 7 schematically illustrates the characteristic curves 74 and 75 of equally designed motion pickup device 31, 72. The ordinate U1 illustrates the first inductive motion pickup device 31 and U2 illustrates the second inductive motion pickup device 72, namely a positive value from the O-lines upwardly and a negative value from the O-line downwardly. The abscissae each represent the path S1 or S2 of the abutment pins 32 or 76 which each act for example through one movable core onto a differential transformer. The two motion pickups are switched in the control device 77 such that the second motion pickup device 72 which engages the template has a control function, while the first motion pickup device 31 trails the second motion pickup device, which can be achieved in the control device for example with the principle of a known bridge balancing.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A control device for use in a tool machine for controlling and positioning a feed carriage having a tool thereon and relative to a machine frame, comprising:
   first and second carriages supported for movement with respect to each other and with respect to said machine frame;
   first means for effecting a coarse adjustment of said first carriage relative to said machine frame;
   second means for effecting a fine adjustment of said second carriage relative to said first carriage, said second carriage having a stop surface thereon; and
   third means on said feed carriage responsive to the location of said stop surface for generating an output signal indicative of the relative position between said feed carriage and said stop surface.

2. The control device according to claim 1, wherein said third means includes an electric motion pickup device for generating a variable electrical signal, the signal value approaching zero as said electric motion pickup device, supported on said feed carriage, is driven toward said stop surface.

3. The control device according to claim 2, wherein said electric motion pickup device includes a movably supported feeler operatively producing said variable electrical signal which varies between a positive and a negative value depending on the position of said feeler relative to a housing structure therefor.

4. The control device according to claim 3, including a temperature-dependent transmitter means located adjacent said tool and wherein said electrical signal is modified by said temperature-dependent transmitter means.

5. The control device according to claim 3, including a second electric motion pickup device having a movably supported feeler operatively producing a second electricl signal having the same or a proportional characteristic line as the first electric motion pickup device and which trails the second motion pickup device which acts as its transmitter.

6. The control device according to claim 3, wherein said second motion pickup device is arranged on said feed carriage and a template is arranged on a longitudinal carriage which is movable relative thereto.

7. The control device according to claim 1, wherein said first means is a threaded spindle with a spindle nut thereon operatively connected to said first carriage.

8. The control device according to claim 7, including adjusting means for shifting the positioning of said first carriage relative to said machine frame between at least two positions.

9. The control device according to claim 8, wherein said adjusting means includes an adjustable stop member movably supported along the path of movement of said first and second carriages and relative to said spindle nut, said stop member engaging said spindle nut to limit the magnitude of movement of said first carriage relative to said machine frame.

10. The control device according to claim 9, wherein said adjusting means further includes a micrometer screw for facilitating a precise adjusting of the position of said stop member.

11. The control device according to claim 1, wherein said second means is a micrometer screw.

12. The control device according to claim 1, wherein at least one cam is provided on one of said first and second carriages, which cam is selectively positionable along the path of said feed carriage.

* * * * *